United States Patent
Eitel

(10) Patent No.: US 10,336,388 B2
(45) Date of Patent: Jul. 2, 2019

(54) FOLDABLE FENDER FOR A MOTOR VEHICLE

(71) Applicant: Bayerische Motoren Werke Aktiengesellschaft, Munich (DE)

(72) Inventor: Bernd Eitel, Rettenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/055,598

(22) Filed: Aug. 6, 2018

(65) Prior Publication Data

US 2018/0346049 A1 Dec. 6, 2018

Related U.S. Application Data

(63) Continuation of application No. PCT/EP2016/079236, filed on Nov. 30, 2016.

(30) Foreign Application Priority Data

Feb. 8, 2016 (DE) .......................... 10 2016 201 841

(51) Int. Cl.
*B62J 15/00* (2006.01)
*B62J 15/02* (2006.01)
*B62D 25/18* (2006.01)

(52) U.S. Cl.
CPC ............ *B62J 15/02* (2013.01); *B62D 25/184* (2013.01); *B62J 15/00* (2013.01)

(58) Field of Classification Search
CPC ............. B62J 15/00; B62J 15/02; B62J 15/04
USPC ................................ 280/152.1, 152.2, 152.3
See application file for complete search history.

(56) References Cited

U.S. PATENT DOCUMENTS

| 2,163,321 | A |   | 6/1939  | Harroun et al. |                    |
|-----------|---|---|---------|----------------|--------------------|
| 4,422,659 | A | * | 12/1983 | Nebu           | B62J 15/00 180/219 |
| 4,485,884 | A | * | 12/1984 | Fukunaga       | B62K 19/48 180/219 |
| 5,489,108 | A | * | 2/1996  | Slade          | B62J 15/00 280/152.3 |
| 5,954,354 | A | * | 9/1999  | Chung          | B62J 15/02 280/152.1 |

(Continued)

FOREIGN PATENT DOCUMENTS

DE 660 002 A 5/1938
DE 295 04 937 U1 9/1995

(Continued)

OTHER PUBLICATIONS

International Search Report (PCT/ISA/210) issued in PCT Application No. PCT/EP2016/079236 dated Jan. 26, 2017 with English translation (six (6) pages).

(Continued)

*Primary Examiner* — Jeffrey J Restifo
(74) *Attorney, Agent, or Firm* — Crowell & Moring LLP

(57) ABSTRACT

A fender for a motor vehicle has at least a first fender section and a second fender section. The second fender section is rotatably connected to the first fender section so as to be able to rotate at least between an operational position and an open position. The rotatable connection between the second fender section and the first fender section is provided by two pin-shaped connecting elements.

15 Claims, 5 Drawing Sheets

(56) References Cited

U.S. PATENT DOCUMENTS

| | | | | | |
|---|---|---|---|---|---|
| 6,695,330 | B2* | 2/2004 | Hata | ................ | B62J 17/00 180/219 |
| 6,913,274 | B2* | 7/2005 | Hsu | ................ | B62J 15/00 280/152.1 |
| 7,641,238 | B2* | 1/2010 | Fujimoto | ................ | B62J 15/00 280/851 |
| 7,766,355 | B2* | 8/2010 | Ichihara | ................ | B62J 15/00 180/219 |
| 8,191,912 | B2* | 6/2012 | Serbinski | ................ | B62J 15/04 280/152.1 |
| 8,246,062 | B2* | 8/2012 | Hsu | ................ | B62J 15/02 280/152.1 |
| 8,317,212 | B2* | 11/2012 | Kobayashi | ................ | B62J 15/04 180/219 |
| 9,004,513 | B1* | 4/2015 | Schacht | ................ | B62J 15/00 280/152.3 |
| 9,233,727 | B1* | 1/2016 | Imamura | ................ | B62J 15/00 |
| 9,481,422 | B2* | 11/2016 | Nishimoto | ................ | B62J 6/04 |
| 2004/0227323 | A1* | 11/2004 | Hsu | ................ | B62J 15/00 280/152.3 |
| 2007/0046016 | A1* | 3/2007 | Fujimoto | ................ | B62J 15/00 280/847 |
| 2010/0140896 | A1* | 6/2010 | McHale | ................ | B62J 1/18 280/152.3 |
| 2016/0144904 | A1* | 5/2016 | Nishimoto | ................ | B62J 17/00 280/281.1 |
| 2016/0214671 | A1* | 7/2016 | Taguma | ................ | B62J 6/04 |

FOREIGN PATENT DOCUMENTS

| | | |
|---|---|---|
| GB | 17975 A | 5/1911 |
| GB | 631946 A | 11/1949 |
| GB | 670888 A | 4/1952 |

OTHER PUBLICATIONS

German-language Written Opinion (PCT/ISA/237) issued in PCT Application No. PCT/EP2016/079236 dated Jan. 26, 2017 (six (6) pages).

German-language Search Report issued in counterpart German Application No. 102016201841.8 dated Dec. 9, 2016 with partial English translation (thirteen (13) pages).

* cited by examiner

FOLDABLE FENDER FOR A MOTOR VEHICLE

CROSS REFERENCE TO RELATED APPLICATIONS

This application is a continuation of PCT International Application No. PCT/EP2016/079236, filed Nov. 30, 2016, which claims priority under 35 U.S.C. § 119 from German Patent Application No. 10 2016 201 841.8, filed Feb. 8, 2016, the entire disclosures of which are herein expressly incorporated by reference.

BACKGROUND AND SUMMARY OF THE INVENTION

The invention relates to a fender for a motor vehicle.

In the mounting or dismounting of wheels on a motor vehicle, fenders—also known as mudguards, depending on the vehicle design—represent an unfavorable restriction of access and of the available manipulating space.

One example of this is motorcycles of larger models, which besides the fender proper also have additional add-on components and permanently installed luggage systems such as saddle bags or pouches, which greatly restrict especially the access to the rear wheel. In order to be able to dismount the rear wheel in these cases, either the luggage system must first be removed at least on one side or the entire fender covering the rear wheel must be dismounted, such dismounting of the fender being especially costly and time consuming. In addition, the complexity is increased in the case when electronic components are integrated in the fender, such as license plate lighting or vehicle running lights, and accordingly an additional wired connection has to be dismounted.

Foldable fenders or license plate holders are already known for an easier disassembly. When necessary, these can be folded up and thereby among other things provide better access, without having to remove the fender entirely or in parts.

Such foldable fenders are generally made of metallic material, in order to have sufficient strength to support a heavy hinge, which is usually formed by a sufficiently strong steel axle. This extends transversely to the vehicle longitudinal axis from one side of the fender to the opposite side of the fender. Thus, on the one hand, its aerodynamic shape, but also its aesthetic appearance, is greatly impaired. Furthermore, the manufacture of these foldable fender layouts is expensive in terms of material, costs, and weight.

Therefore the problem which the invention proposes to solve is to provide a fender layout which, on the one hand, enables easy access to and mounting of the corresponding vehicle wheel and, on the other hand, allows the most light and compact design possible.

This problem is solved by a fender for a motor vehicle with at least a first fender section and a second fender section, wherein the second fender section is rotatably connected to the first fender section so as to be able to rotate at least between an operational position and an open position. Furthermore, the rotatable connection between the second fender section and the first fender section is provided by two pin-shaped connection elements.

The fender accordingly comprises at least the first and second fender sections. For example, the two fender sections are arranged one behind the other in a vehicle lengthwise direction. The second fender section can be rotated or folded on account of the rotatable connection with respect to the first fender section, for example between at least two positions: the operational position and the open position, in order to provide an easier access to the corresponding vehicle wheel at least in the open position and to facilitate its mounting or dismounting. With the aid of the two pin-shaped connection elements, there is no need for a heavy and continuous pin axle or rotation axle or a cumbersome hinge, so that the entire fender can be thinner and lighter in its construction. Likewise, no special mounting device is needed, unlike the known pin axles or rotation axles.

Thus, with this design of the fender, mounting is easier and the overall weight of the fender is reduced. Depending on the arrangement, the two pin-shaped connection elements can be integrated discreetly and aerodynamically inconspicuously in the fender. Furthermore, the vehicle wheel can be removed or installed without costly dismounting of the second fender section and without the possible removal of electrical wiring or connections.

To place the vehicle in operation, the second fender section can be folded from the open position back down into the operational position, the operational position being defined for example by an end stop for the second fender section or by a locking device to be described in further detail hereafter.

Preferably, the second fender section constitutes a rear end of the fender and/or is designed as a license plate holder to carry a license plate. This means that the second fender section is arranged behind the first fender section in the vehicle lengthwise direction so that it forms a rear termination of the fender. Alternatively or additionally, the second fender section is designed as a license plate holder, so that a license plate arranged optionally in (or on) the license plate holder can be folded up when necessary with the second fender section, in order to allow access to the vehicle wheel.

Furthermore, the two pin-shaped connection elements may be designed as screws, especially collar screws, or rivets. Accordingly, the second fender section may be screwed or riveted to the first fender section and this connection may act as a joint or hinge. The use of collar screws also enables the surface loading of the first and second fender sections to be minimized in the associated connection area, due to the large diameter of the screw flange, so that comparatively thin wall thicknesses of the fender sections can be realized.

Preferably, the two pin-shaped connection elements are arranged on two opposite sides of the fender in terms of a vehicle longitudinal axis and are coaxially oriented in prolongation of one another. In this way, the two pin-shaped connection elements form a common axis of rotation, yet without requiring a continuous and heavy shaft for this purpose.

According to another embodiment, the fender may include a locking device for locking the second fender section with respect to the first fender section. For example, this makes it possible to lock the second fender section in at least one defined position. This may be the operational position, for example, in which the vehicle is ready to operate, or an open position, in which the corresponding vehicle wheel is more easily accessible. Of course, the locking device may also lock in both positions as well as any given number of intermediate positions.

Alternatively, the two connection elements may join together the first and the second fender section such that a defined friction effect is produced in the area of the rotational axis so formed, so that at least when the vehicle is parked, i.e., not moving, the second fender section can be rotated into any desired position with respect to the first fender section and is held there by virtue of the friction of the connection formed by the connection elements.

Furthermore, the locking device may include at least one additional screw, a snap-lock system and/or an interlocking device with at least one locking position.

Preferably, the first fender section and/or the second fender section are made of plastic, especially as an injection molded part, so that light and economical parts as well as complex part geometries can be created.

According to another embodiment, the second fender section in the operational position constitutes a steady continuation of the first fender section. This means that the shape of the first fender section is continuously extended by the second fender section. For this purpose, an end of the second fender section facing the first fender section may have an identical or at least similar cross section to the end of the first fender section facing the second fender section.

Preferably, the motor vehicle is a motorcycle or a vehicle similar to a motorcycle, especially a scooter, a two-wheel, three-wheel or four-wheel motor scooter, a trike or a quad.

Likewise preferably, the fender is coordinated with a rear wheel of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
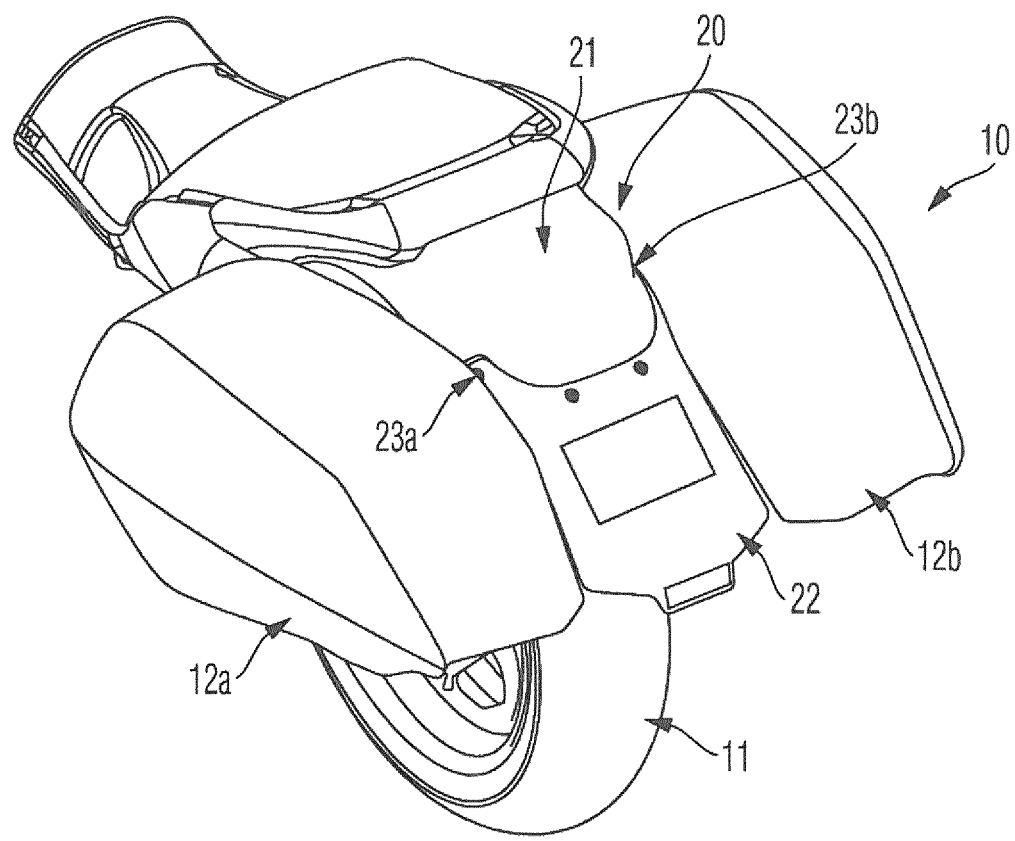
FIG. 1 is a perspective view of a rear of a motorcycle with a fender according to the specification, in an operational position.

FIG. 1 shows in perspective view a rear 10 of a motorcycle, shown only partly, where a fender 20 is associated with a rear wheel 11 of the motorcycle. The fender 20 is foldable and has a first fender section 21 and a second fender section 22, The second fender section 22 is joined to the first fender section 21 in a rotationally movable manner in order to rotate between an operational position as represented in FIG. 1 and an open position (see FIGS. 2 and 4). The second fender section 22 is joined to the first fender section 21 in the rotationally movable manner by way of two pin-shaped connection elements 23a, 23b.

Near the rear wheel 11 of the motorcycle, on both its left and its right side (each time relative to a direction of movement of the motorcycle), there is arranged a saddle bag 12a, 12b, making access to the rear wheel 11 quite difficult.

Figure 2:
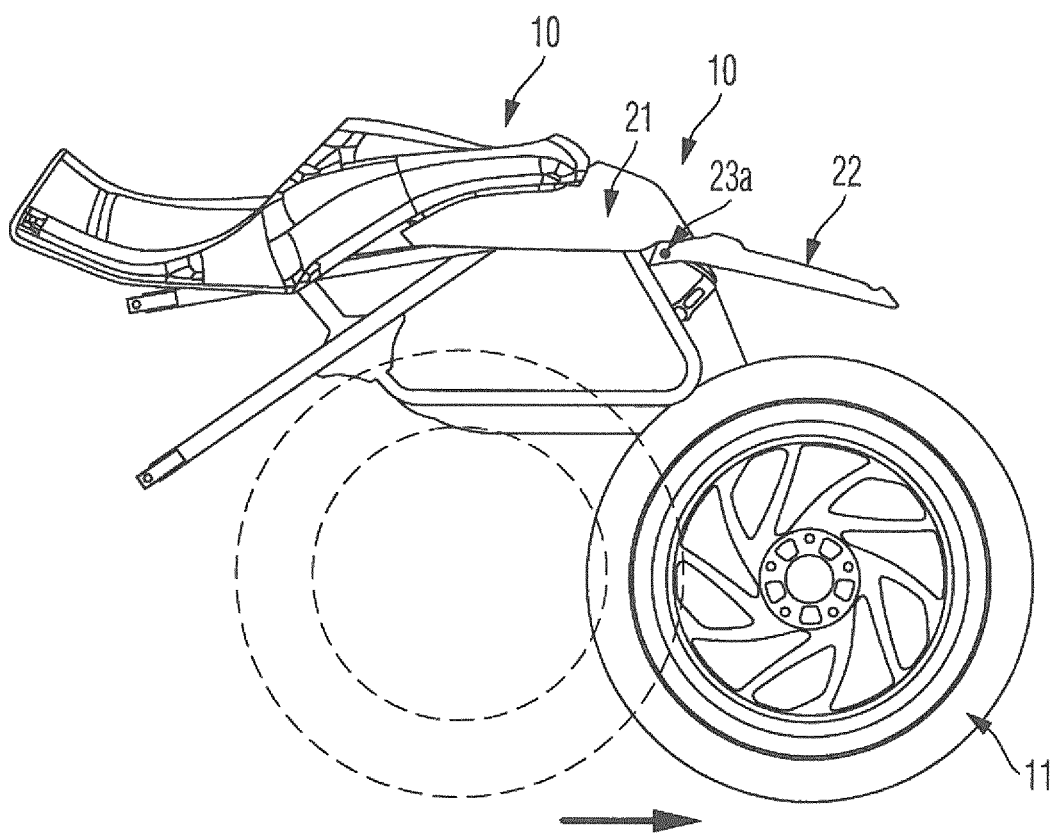
FIG. 2 is a partial side view of the motorcycle rear during a dismounting of a rear wheel.

FIG. 2 therefore shows in a partial side view of the rear 10 a dismounting of the rear wheel 11. Owing to the rotating ability of the second fender section 22 with respect to the first fender section 21, the second fender section 22 can be rotated or folded into an open position, depicted in FIG. 2, enabling better access to and removal of the rear wheel 11.

Figure 3:
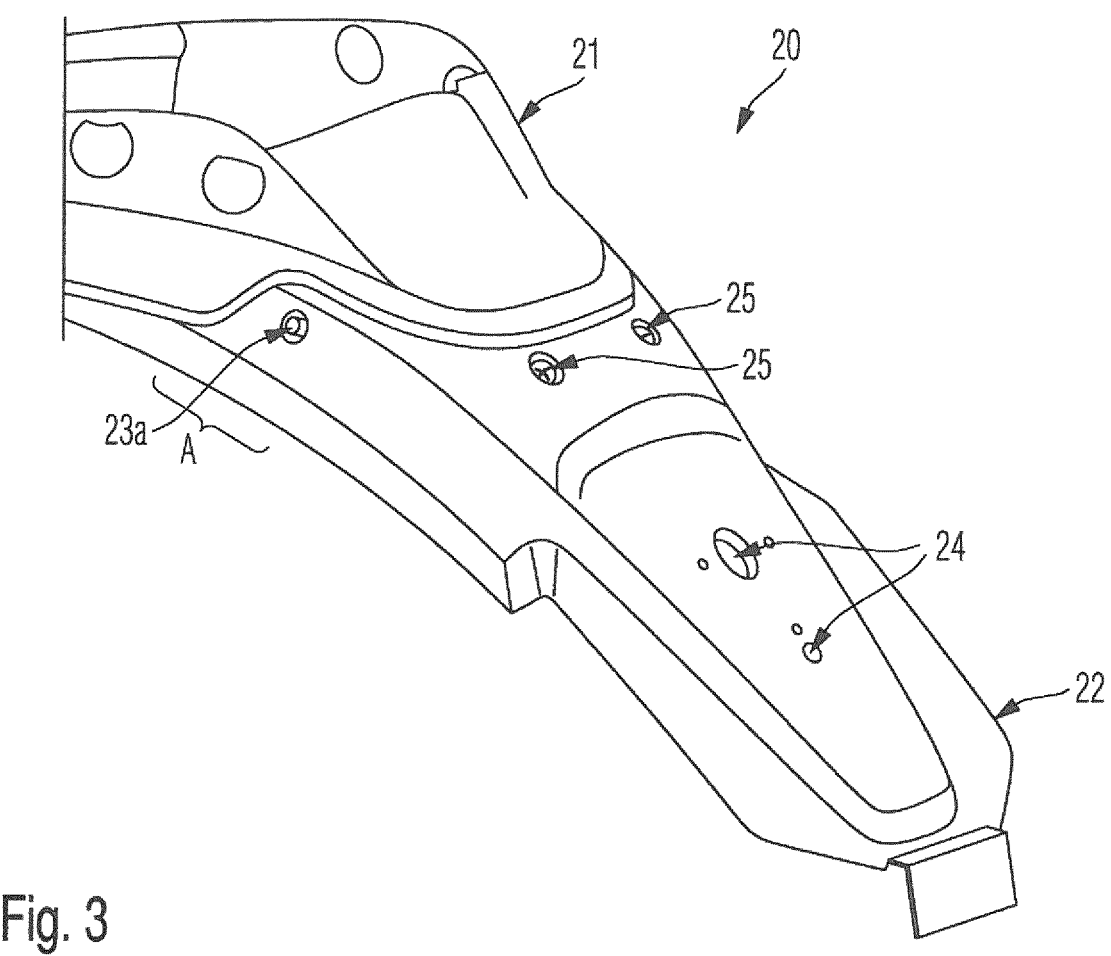
FIG. 3 is a detail view of the fender of FIG. 1 in the operational position.

FIG. 3 shows in a detail view the described fender 20 in a ready-to-use operational position. In the embodiment depicted, the second fender section 22 constitutes a rear end of the fender 20 and is additionally designed as a license plate holder to receive a license plate (not shown). For this purpose, the second fender section 22 has a number of recesses 24 for inserting or screwing in the license plate.

The two pin-shaped connection elements 23a, 23b are arranged on two opposite sides of the fender 20 in terms of a vehicle lengthwise direction and are coaxially oriented in prolongation of one another. Owing to the view, only the connection element 23a visible in this perspective is shown. Of course, however, the other connection element is analogous in design and positioned in mirror symmetry to the vehicle lengthwise axis arranged at the center of the vehicle. Furthermore, the two pin-shaped connection elements 23a, 23b are designed as screws, especially as collar screws, so that a relatively slight surface loading can be achieved in the connection area A of the two fender sections 21, 22, and therefore the strength requirements for the fender sections 21, 22 can be less than would be needed in the case of heavy and continuous rotation axles.

Optionally, the fender 20 may include a locking device 25 for locking the second fender section 22 with respect to the first fender section 21. The depicted locking device 25 comprises two additional screws, which connect the second fender section 22 in the operational position to the first fender section 21. In the depicted operational position, the second fender section 22 furthermore constitutes a steady or uniform continuation of the first fender section 21.

Preferably, the first fender section 21 and/or the second fender section 22 are made of plastic, especially as an injection molded part.

Figure 4:
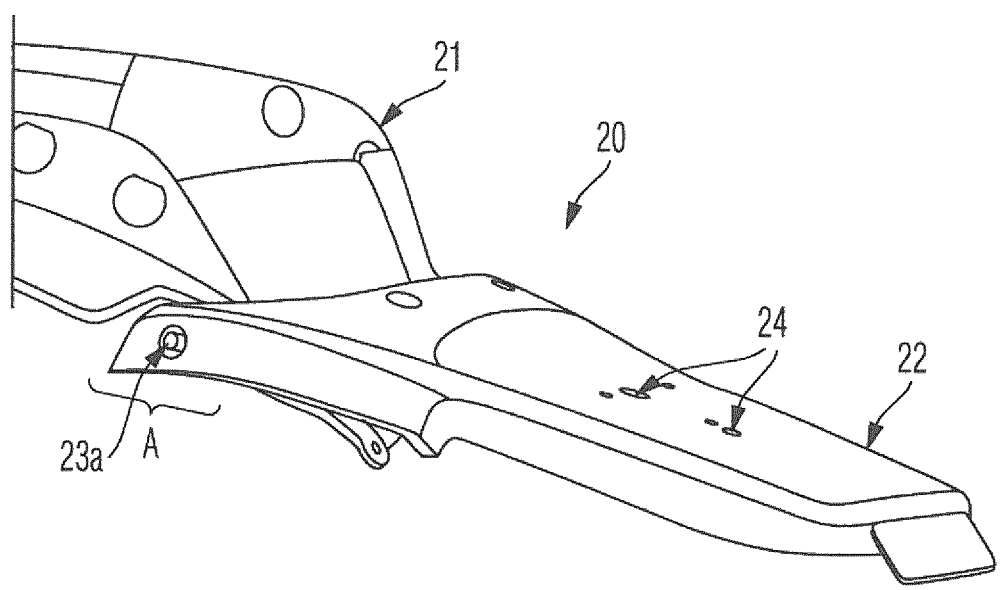
FIG. 4 is the fender of FIG. 3 in an open position.

FIG. 4 shows the fender 20 represented in FIG. 3 in the open position. In this position, the second fender section 22 is rotated relative to the first fender section 21 about the connection elements 23a, 23b, acting as a hinge, and enables better access to the wheel 11 (see FIG. 2).

Figure 5:
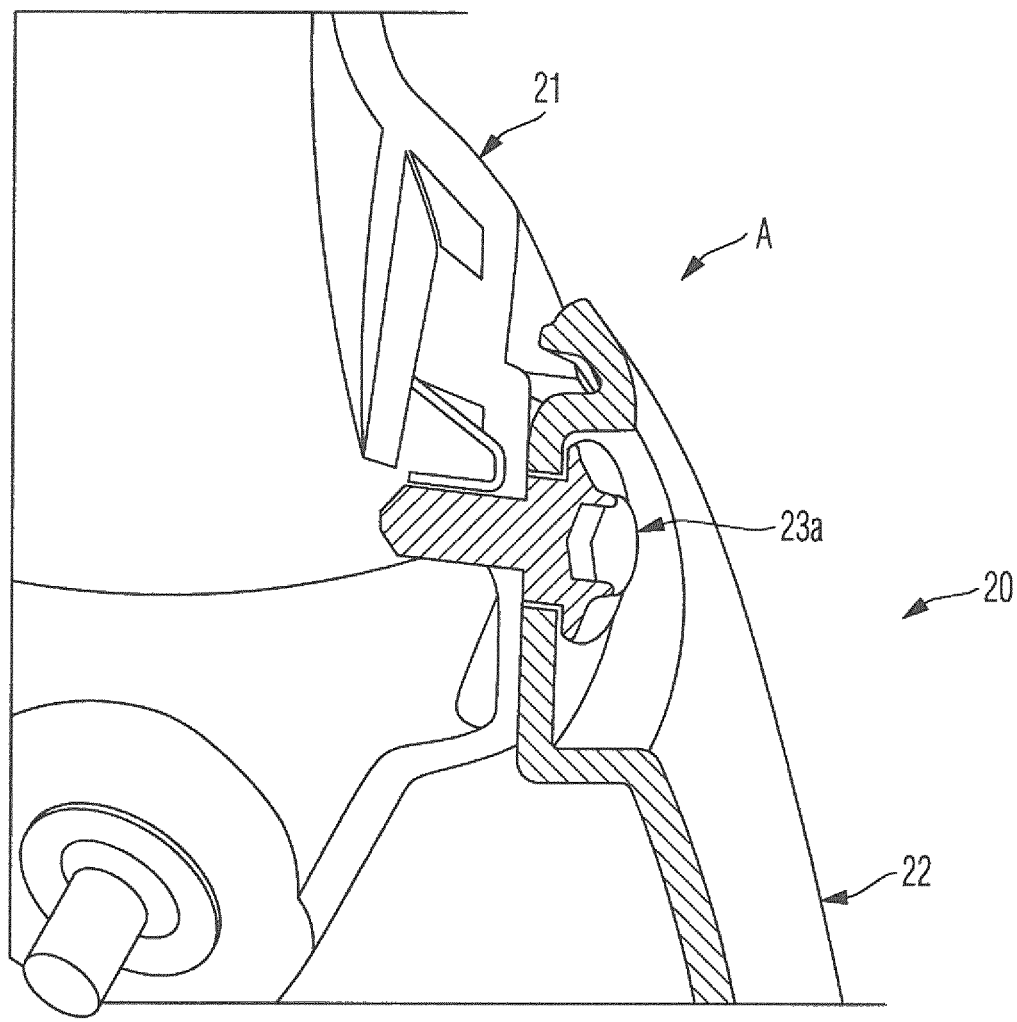
FIG. 5 is a cross section view of a connection area of the fender of FIG. 3.

FIG. 5 shows in a detailed cross section view the connection area A of the fender 10 according to FIG. 3. In particular, a first lateral rotatable connection of the first 21 and the second fender section 22 by way of a connection element 23a, designed as a collar screw, is represented. Of course, the detail view only shows the connection provided on this fender side. Of course, a second lateral connection may be designed analogously on an opposite fender side, in which case the respective rotational axes defined by the two connection elements 23a, 23b are preferably arranged on two opposite sides in terms of the vehicle longitudinal axis and are coaxially oriented in prolongation of one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fender for a motor vehicle, comprising:
   a first fender section and a second fender section; and
   two pin-shaped connection elements,
   wherein
      the second fender section is rotatably connected to the first fender section so as to be able to rotate at least between an operational position and an open position,
      the rotatable connection between the second fender section and the first fender section is provided by the two pin-shaped connection elements, and the second fender section overlaps a support portion of the first fender section extending away from a rotation axis between the two pin-shaped connection elements toward the second fender section.

2. The fender as claimed in claim 1, wherein
the second fender section is one or both of a rear end of the fender and a license plate holder to carry a license plate.

3. The fender as claimed in claim 1, wherein
the two pin-shaped connection elements are screws.

4. The fender as claimed in claim 3, further comprising:
a locking device for locking the second fender section with respect to the first fender section configured to lock the second fender section to the support portion of the first fender extension.

5. The fender as claimed in claim 4, wherein
the locking device comprises at least one additional screw, a snap-lock system and/or an interlocking device with at least one locking position.

6. The fender as claimed in claim 1, wherein
the two pin-shaped connection elements are collar screws.

7. The fender as claimed in claim 1, wherein
the two pin-shaped connection elements are rivets.

8. The fender as claimed in claim 1, wherein
the two pin-shaped connection elements are arranged on two opposite sides of the fender in terms of a vehicle longitudinal axis and are coaxially oriented in prolongation of one another.

9. The fender as claimed in claim 1, further comprising:
a locking device for locking the second fender section with respect to the first fender section configured to lock the second fender section to the support portion of the first fender extension.

10. The fender as claimed in claim 1, wherein
the first fender section and/or the second fender section are made of plastic.

11. The fender as claimed in claim 10, wherein
the first fender section and/or the second fender section are injection molded parts.

12. The fender as claimed in claim 1, wherein
the second fender section in the operational position constitutes a steady continuation of the first fender section.

13. The fender as claimed in claim 1, wherein
the motor vehicle is a motorcycle.

14. The fender as claimed in claim 1, wherein
the motor vehicle is a scooter, a two-wheel, three-wheel or four-wheel motor scooter, a trike or a quad.

15. The fender as claimed in claim 1, wherein
the fender is configured in association with a rear wheel of the motor vehicle.

* * * * *